United States Patent [19]
Andersen et al.

[11] 3,982,851
[45] Sept. 28, 1976

[54] TIP CAP APPARATUS

[75] Inventors: Richard H. Andersen; William A. Litzinger; Robert J. Corsmeier, all of Cincinnati, Ohio

[73] Assignee: General Electric Company, Cincinnati, Ohio

[22] Filed: Sept. 2, 1975

[21] Appl. No.: 609,346

[52] U.S. Cl. .................................. 416/92; 416/232
[51] Int. Cl.² ......................................... F01D 5/18
[58] Field of Search .......... 416/232, 233, 92, 95–97, 416/228

[56] References Cited
UNITED STATES PATENTS

| | | | |
|---|---|---|---|
| 3,574,482 | 4/1971 | Savage et al. | 416/90 |
| 3,626,568 | 12/1971 | Silverstein et al. | 29/156.8 H |
| 3,761,201 | 9/1973 | Silverstein et al. | 416/232 |
| 3,899,267 | 8/1975 | Dennis et al. | 416/92 |

Primary Examiner—Everette A. Powell, Jr.
Attorney, Agent, or Firm—Dana F. Bigelow; Derek P. Lawrence

[57] ABSTRACT

A hollow turbomachinery blade is formed by way of casting or the like with an open tip end except for a bridge which is formed integrally with the blade side walls at a central position with respect to the leading and trailing edges. Also formed integrally with the blade side walls, proximate the tip end openings near the leading and trailing edges, are a plurality of supporting and retaining bosses, the supporting bosses being in substantially the same plane as the bridge, and the retaining bosses being disposed radially outward thereof. Each of the forward and rear tip caps is installed by placing it over the bridge and then sliding it either forward or rearward to be captured by the supporting and retaining bosses and to thereby close the respective tip opening. Each of the tip caps is then brazed into position so as not to allow its sliding back out.

26 Claims, 6 Drawing Figures

U.S. Patent  Sept. 28, 1976  3,982,851
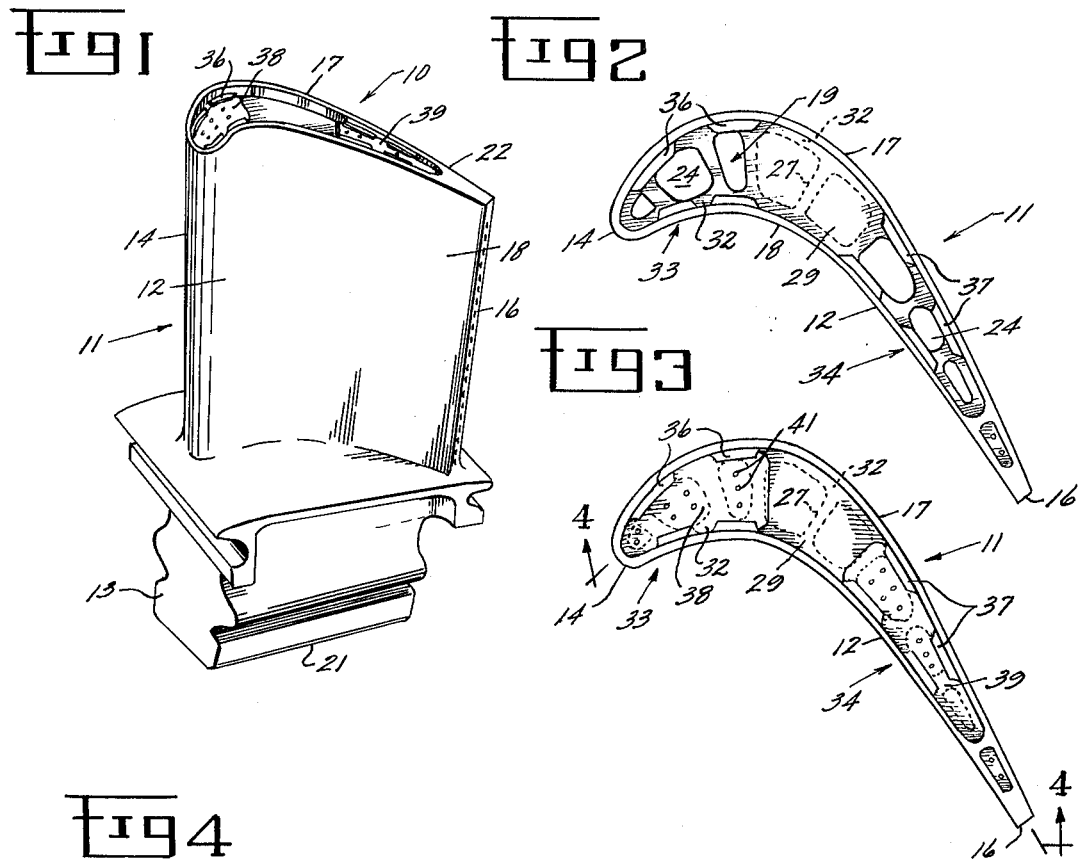
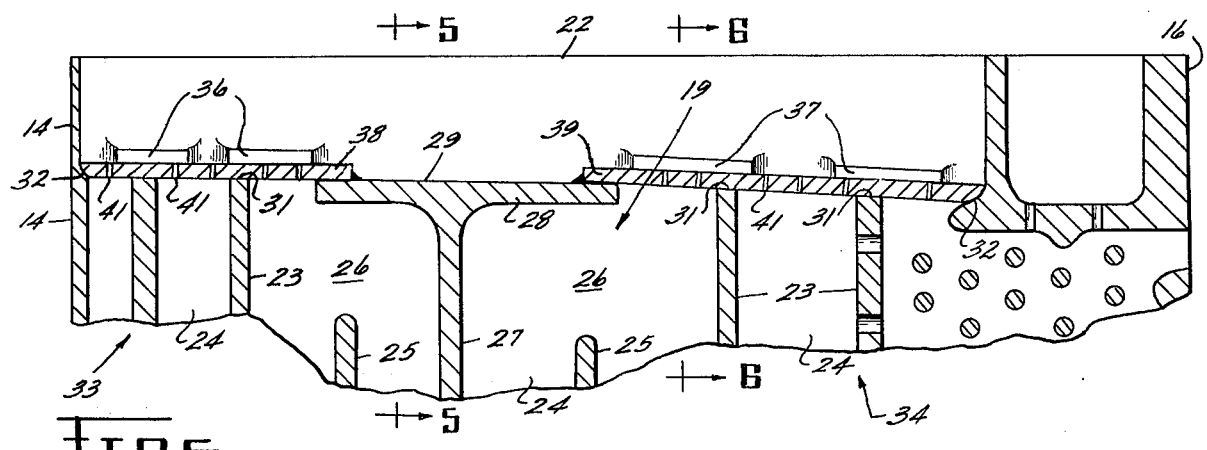
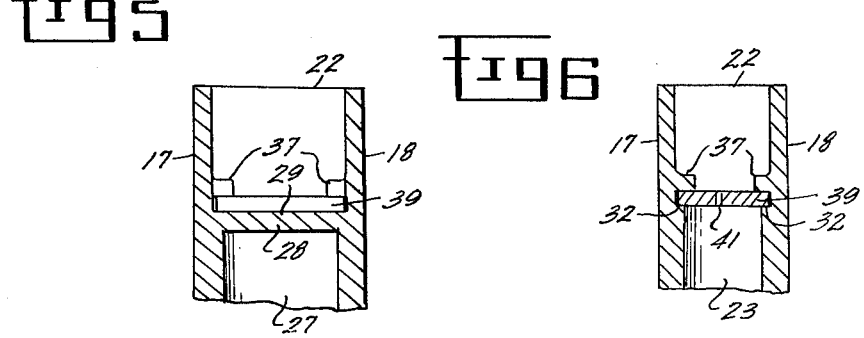

TIP CAP APPARATUS

The invention herein described was made in the course of or under a contract, or a subcontract thereunder, with the United States Department of the Air Force.

BACKGROUND OF THE INVENTION

This invention relates primarily to turbomachinery blades and, more particularly, to a tip cap configuration for a turbomachinery blade and a method of installing such a configuration.

A turbomachinery blade is comprised of a retaining or shank section, a platform section and an airfoil section. Since it is desirable that a turbomachine be operated at very high speeds and temperatures, the airfoil section of the blade is perferably formed of relatively thin, convex and concave side walls defining an internal cavity which has provided therein means for cooling the blade side walls. In an air-cooled blade, the cooling air is commonly brought in through passageways in the shank portion of the blade to the airfoil cavity which is divided by a plurality of ribs into heat transfer chambers and serpentine passageways. The cooling air within the cavity acts to cool the blade side walls by a combination of impingement, convection and film cooling, and is then normally discharged out through film holes and the trailing edge holes.

Because of the critical aerodynamic shape of the blade, and the required intricate structure in the cavity portion thereof, the only practical method of fabrication has been by way of the casting process, wherein precision casting techniques are used to fabricate the turbine blade airfoil and shank section by way of the relatively old "lost wax" technique. When such an investment casting is used for the turbine blade, it is desirable to use a ceramic or glass core to form the internal chambers and passageways within the airfoil cavity. This is normally facilitated by leaving open the tip end of the airfoil and allowing the ceramic core to extend outwardly therefrom for purposes of handling and positioning for location during the fabrication process. It then subsequently becomes necessary to seal the tip end of the blade in order to prevent cooling fluid from being wastefully discharged into the gas stream. This open tip end of the blade is generally sealed by means of a tip cap which is joined to the blade in either a permanent manner, or in a semipermanent manner which allows removal and replacement thereof. Attachment of the tip cap can be accomplished in various ways, a number of which are discussed in U.S. patent application Ser. No. 530,720, filed Dec. 9, 1974, and assigned to the assignee of the present invention.

As is well known in the art, the satisfactory attachment of the tip cap to the open tip of the blade is not a simple task. Not only is the tip cap exposed to very high temperatures, but, more importantly, the high speed rotation of the blade tends to expose the tip cap to tremendously high centrifugal forces which tend to separate the tip cap from the blade. Accordingly, in most attachment schemes, there is involved some form of crimping process wherein a portion of each of the blade concave and convex side walls is crimped inwardly to capture the tip cap thereunder. The difficulty with the use of such a process is two-fold. First of all, the performance characteristics of a turbomachine blade are such that if the aerodynamic shape of the blade is altered to any significant degree, the efficiency thereof will be greatly reduced. Therefore, if the airfoil tip ends are bent inwardly so that they do not form a substantially straight-line extension of the adjoining portion of the blade, the performance characteristics will be substantially affected.

The second problem with the crimping process, is that when the side wall material is crimped, there tends to be a longitudinal deformation of the material, since neither the convex nor the concave sides can otherwise accommodate such a crimping process. That is, when a portion of the convex side wall is crimped, there tends to be an excess of material, and a portion thereof may buckle or crack causing the part to be scrapped. However, when a portion of the concave side is crimped toward the airfoil open end, there is a deficiency of material, and a stress condition is created in the blade side wall which tends to stretch the blade material beyond its capability, cause cracking and the necessary scrapping of an otherwise good turbine blade.

It is therefore an object of this invention to provide a turbine blade having superior aerodynamic characteristics.

Another object of this invention is the provision for installing a tip cap on a hollow turbomachinery blade without the necessity of crimping certain portions of the blade.

Still another object of this invention is the provision for an economical and effective method of installing the tip cap on a hollow turbomachinery blade.

These objects and other features and advantages become more readily apparent upon reference to the following description when taken in conjunction with the appended drawings.

SUMMARY OF THE INVENTION

Briefly, and in accordance with one aspect of the invention, a portion of the tip end is closed by way of a bridge which is integrally cast with the blade side walls. Also cast integrally with the blade side walls, are a plurality of bosses in the cavity open end portions which are not covered by the cap. The bosses include support bosses which are disposed in substantially the same plane as the bridge, and retainer bosses which are disposed in a plane radially outward therefrom. The support and retaining bosses in combination define a slot for receiving a tip cap to close that portion of the open tip end adjacent the bridge. To assemble the tip cap into the slot, it is first placed over the bridge and then slid into the slot and a braze is applied thereto to retain it in that position.

By another aspect of this invention the integral bridge is disposed in a central position with respect to the leading and trailing edges of the blade, and a pair of tip caps, one for the leading edge and one for the trailing edge portion of the tip cap end, are used to close the tip end.

By a further aspect of this invention, the tip caps are substantially planar in form and have formed therein a plurality of holes for conducting the flow of cooling air from the internal cavity to the exterior thereof to cool the blade tip ends by impingement of air thereon.

In the drawings as hereinafter described, a preferred embodiment is depicted; however, various other modifications and alternate constructions can be made thereto without departing from the true spirit and scope of the invention.

BRIEF DESCRIPTION OF THE DRAWINGS

FIG. 1 is a perspective view of a turbomachinery blade in accordance with the preferred embodiment of the invention.

FIG. 2 is a chordwise end view of the airfoil portion of the blade prior to the installation of the tip caps.

FIG. 3 is an end view thereof with the tip caps in the installed position.

FIG. 4 is an enlarged fragmentary sectional view of the blade as seen along lines 4—4 of FIG. 3.

FIG. 5 is an enlarged fragmentary sectional view of the blade as seen along lines 5—5 of FIG. 4.

FIG. 6 is an enlarged fragmentary sectional view of the blade as seen along lines 6—6 of FIG. 4.

DESCRIPTION OF THE PREFERRED EMBODIMENT

Referring now to the drawings, reference is initially made to FIG. 1 where the present invention is indicated generally at 10 as applied to a turbine blade 11 which comprises an airfoil portion 12 and an attachment or shank portion 13 adapted to secure the blade to a turbine rotor (not shown) in a well-known manner, with the airfoil portion 12 extending generally radially across a motive fluid flow passage. The airfoil portion 12 includes a leading edge 14 and a chordwise spaced trailing edge 16 interconnected by convex and concave side wall portions 17 and 18, respectively. The airfoil portion 12 is suitably shaped in a well-known manner so as to efficiently extract energy from the motive fluid as it flows through the blade row to thereby impart rotary motion to the rotor.

Fabrication of the blade structure 12 is preferably accomplished by the casting process, wherein both the external and internal surfaces are formed by way of the well-known investment casting process. Thus, the plurality of internal cavities 19 (FIGS. 2 and 4) which make up the hollow portion of the airfoil 12, are formed by way of a ceramic core (not shown) which extends from the blade inner end 21 up through the central portion of the shank 13 to provide air entry holes into the airfoil section, and then through the airfoil section to the outer or distal end 22 of the blade. During the casting process then, the ceramic core occupies the principal portions of the hollow space within the airfoil so that the resulting casting is hollow except for those minor portions which were not occupied by the core. These minor portions of the hollow blade are thus filled with casting material to provide a plurality of longitudinal ribs 23 extending the radial length of the airfoil to divide it into a plurality of compartments 24. A number of shorter ribs 25 may also be provided to further compartmentalize the hollow blade so as to thereby establish sinuous passageways 26 for the flow of cooling air therein.

At a point somewhat centrally with respect to the blade leading and trailing edges 14 and 16, respectively, a central rib 27 extends radially outward to a point near the blade outer end 22 where it terminates in a bridge 28 to form a T-shaped structure, the bridge portion thereof being integrally connected to the convex and concave side walls, 17 and 18, respectively, to thereby provide a partial closure for the open outer end 22. The radially outer surface 29 of the bridge 28 is substantially planar in form and is substantially parallel with the blade outer end 22. It is preferred that the central rib 27 and the associated bridge 28 be cast integrally with the blade side walls 17 and 18.

Referring now to the longitudinal ribs 23 (FIGS. 2 and 4), it will be recognized that they extend radially outwardly to the point where their ends 31 are in substantially the same plane as that of the bridge 28 outer surface 29. It is these end surfaces 31, along with their associated peripheral wall attachment surface 32 (FIG. 2), which form the support structure for the tip cap elements subsequently installed to further close the open tip end 22.

Referring to FIG. 2, the blade outer end 22 is seen prior to the installation of the tip caps, and includes a central portion which is covered by the integral bridge 28, and leading and trailing edge cavity portions, indicated generally by the numerals 33 and 34, and which require some form of closure by way of tip caps to complete the blade structure.

Surrounding the leading edge cavity portion 33 is a plurality of bosses 36 disposed around the inner periphery of the blade side walls, and in radially outwardly spaced relationship with the rib outer end 31. In a similar manner, a plurality of bosses 37 are disposed around the trailing edge cavity portion 34. It is these bosses together with their associated and oppositely disposed rib ends 31 which act to receive and retain the tip caps which are installed to complete the closure of the blade tip ends 22. The forward and rearward blade tip caps 38 and 39, respectively, are shown in their installed positions in FIGS. 3–6.

It should be understood that the relative size of the cast bridge 28 with that of the individual tip caps 38 and 39 is significant when considering the method of installation. To install either of the tip caps it is necessary to first pass it over the bridge outer surface 29 and then into its slot between the rib outer end 31 and the respective bosses. That is, a typical installation of the forward tip cap 38 would require a placing of the tip cap with its flat surface against the bridge outer surface 29 and then a sliding of the tip cap forward to position where it is captured between the radially outer bosses 36 and the radially inner platform formed from the rib outer end 31 and the associated wall attachment surface 32. A similar process would then be followed with the rear tip cap 39 which would be slid rearwardly into its proper position. In order to more permanently retain the tip caps in their proper position, it is preferred that they be brazed to both the integral bridge 28 and to the blade side walls 17 and 18 to prevent their sliding out of their positions and also to prevent leakage of cooling air along the edges thereof. It is further preferred that the rib outer ends 31 be attached to their respective tip caps by way of brazing or the like to prevent the leakage of air thereacross which would thereby short circuit the cooling air flow within the hollow chambers of the blade.

It is further preferred that a plurality of holes 41 be formed in the tip cap to conduct the flow of cooling air from the hollow portion of the airfoil to the tip end portion thereof where it is impinged against the side walls to form a cooling process as is well known in the art.

It will be readily apparent from the description that the Applicants' inventive method and apparatus can be modified in numerous ways without departing from the broader aspects thereof. For example, the size and position of the cast bridge 28 may be varied to accommodate different sized tip caps. Further, the number of tip caps that are employed is not necessarily limited to the use of two as shown. For example, depending on the required aerodynamic shape and the desired blade internal cavity structure, the Applicants can envision the use of a cast bridge disposed in a position relatively forward of that shown in FIG. 4, and the corresponding use of a smaller forward tip cap 38 and a larger rear tip cap 39. The Applicants can further envision the use of a cast bridge which occupies the entire forward portion of the tip end, and the associated use of a single tip cap which is installed in the rear portion thereof in a manner similar to that of the tip cap 39. Also, these "slide in" tip caps can be used for not only fluid seals, but to retain items inside the airfoil such as impingement baffles, blade dampers, etc. The appended claims are intended to cover the modifications similar to those described above which fall within the broader aspects of Applicants' invention.

Having thus described the invention, what is considered novel and desired to be secured by Letters Patent of the United States is:

1. An improved turbomachine blade structure of the type having convex and concave side walls defining a cavity with a radially outer open end and a tip cap which forms the closure for the open end, the cavity having both platform means and retaining means for preventing the cap movement in the radially inward and outward directions, respectively, wherein the improvement comprises:
   a. closure means disposed in the cavity at a location radially inward from said retaining means to close a portion of the open end; and
   b. a tip cap disposed in the cavity for closing another portion of the open end, the size and shape of said tip cap being such as to allow its insertion between the platform and retaining means by initially placing a portion thereof contiguous with the outer surface of said closure means and then sliding it into the desired position.

2. The improved turbomachine blade structure of claim 1 wherein said closure means and said tip cap are contiguous at portions thereof to form a combined closure.

3. The improved turbomachine blade structure of claim 1 wherein the outer surface of said closure means is substantially in the same plane as the outer surface of the platform.

4. The improved turbomachine blade structure of claim 1 wherein said closure means is disposed centrally within said cavity and said tip cap is disposed adjacent the leading edge of the blade.

5. The improved turbomachine blade structure of claim 1 wherein said closure means is disposed centrally within said cavity and said tip cap is disposed adjacent the trailing edge of the blade.

6. The improved turbomachine blade structure of claim 1 wherein said tip cap is shaped in substantial conformance with a portion of the cavity.

7. The improved turbomachine blade structure of claim 1 wherein said closure means is integrally formed with the blade side walls.

8. The improved turbomachine blade structure of claim 1 wherein the retaining means includes a brazing material.

9. The improved turbomachine blade structure of claim 1 wherein the blade includes at least one longitudinal rib to define a flow path within the blade.

10. The improved turbomachine blade structure of claim 9 wherein said tip cap is contiguous with said blade side walls.

11. The improved turbomachine blade structure of claim 10 wherein said rib is connected to said tip cap as by brazing.

12. The improved turbomachine blade structure of claim 1 wherein said tip cap is substantially planar in form.

13. The improved turbomachine blade structure of claim 1 and further including a second tip cap disposed in the cavity for closing a third portion of the open end, the size and shape of said second tip cap being such as to permit its insertion between the platform and retaining means by initially placing a portion thereof contiguous with the outer surface of said closure means and then sliding it into its desired position.

14. The improved turbomachine blade structure of claim 13 wherein said tip cap is disposed adjacent the blade leading edge and said second tip cap is disposed adjacent the blade trailing edge.

15. An improved turbomachine blade as set forth in claim 1 wherein said tip cap has a plurality of holes formed therein to conduct the flow of coolant from the blade cavity.

16. An improved turbomachine blade structure of the type having convex and concave side walls defining a cavity with a radially outer tip end and a tip cap which forms a closure for the tip end, wherein the improvement comprises:
   a. a closure element disposed in the cavity and interconnecting the side walls near the tip end to close a portion thereof;
   b. platform means disposed in the cavity along the inner surface of said side walls, the radially outer surface being in substantially the same plane as the radially outer surface of said closure element;
   c. a tip cap disposed partially on said closure element and partially on said platform means to close another portion of the tip end; and
   d. means for retaining said tip cap from movement in the radially outer direction.

17. An improved turbomachine blade as set forth in claim 16 wherein said closure element is formed integrally with the blade side walls.

18. An improved turbomachine blade as set forth in claim 16 wherein said closure element is disposed substantially centrally with respect to the blade leading and trailing edges.

19. An improved turbomachine blade as set forth in claim 16 and including a second tip cap disposed partially on said closure element and partially on said platform means to close a third portion of the tip end and further including means for retaining said second tip cap from movement in the radially outer direction.

20. An improved turbomachine blade as set forth in claim 16 wherein said platform means is formed integrally with said side walls.

21. An improved turbomachine blade as set forth in claim 16 wherein said tip cap is substantially planar in form.

22. An improved turbomachine blade as set forth in claim 16 wherein said tip cap has a plurality of holes formed therein to conduct the flow of coolant from the blade cavity.

23. An improved turbomachine blade as set forth in claim 16 wherein said retaining means comprises at least one boss formed integrally with said side walls.

24. An improved turbomachine blade as set forth in claim 16 wherein the blade includes at least one longitudinal rib to define a flow path within the blade.

25. An improved turbomachine blade as set forth in claim 16 wherein said tip cap is contiguous with said rib at its radially outer end.

26. An improved turbomachine blade as set forth in claim 16 wherein said rib is connected to said tip cap as by brazing.

* * * * *